US012745102B2

(12) United States Patent
Tayyab et al.

(10) Patent No.: US 12,745,102 B2
(45) Date of Patent: Sep. 22, 2026

(54) RECONFIGURABLE INTELLIGENT SURFACE ASSISTED COMMUNICATION

(71) Applicant: Nokia Technologies Oy, Espoo (FI)

(72) Inventors: Muhammad Tayyab, Oulu (FI); Dilin Lalindra Dampahalage, Oulu (FI); Rapeepat Ratasuk, Naperville, IL (US); Nitin Mangalvedhe, Naperville, IL (US); Muhammad Majid Butt, Naperville, IL (US); Gilsoo Lee, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 326 days.

(21) Appl. No.: 18/399,536

(22) Filed: Dec. 28, 2023

(65) Prior Publication Data

US 2024/0224066 A1 Jul. 4, 2024

Related U.S. Application Data

(60) Provisional application No. 63/477,642, filed on Dec. 29, 2022.

(51) Int. Cl.
*H04W 16/26* (2009.01)
*G16Y 10/75* (2020.01)

(52) U.S. Cl.
CPC ............. *H04W 16/26* (2013.01); *G16Y 10/75* (2020.01)

(58) Field of Classification Search
CPC ..... H04W 72/23; H04W 24/10; H04W 72/21; H04W 80/02; H04W 92/18; H04W 24/02;
(Continued)

(56) References Cited

U.S. PATENT DOCUMENTS 11,728,571 B2 8/2023 Alkhateeb et al.
2020/0137657 A1 4/2020 Chavva et al.
(Continued)

FOREIGN PATENT DOCUMENTS

WO 2021/239259 A1 12/2021
WO 2022/133957 A1 6/2022
(Continued)

OTHER PUBLICATIONS

Wu et al., "Towards smart and reconfigurable environment: Intelligent reflecting surface aided wireless network", IEEE Communications Magazine, vol. 58, No. 1, Jan. 2020, pp. 106-112.
(Continued)

*Primary Examiner* — Ajibola A Akinyemi
(74) *Attorney, Agent, or Firm* — Barta Jones, PLLC

(57) ABSTRACT

Example embodiments of the present disclosure relate to reconfigurable intelligent surfaces (RIS) assisted communication. For example, RIS assisted blockage avoidance for low power internet of things (IoT) devices. An apparatus performs communication with a network device via a RIS, using at least one of a first channel or a second channel, wherein the first channel is for a transmission to the RIS and the second channel is for a reception from the RIS. In this way, it is possible to help reconnecting an IoT device with the network that has lost its connection with a gNB by using an RIS. It is also provided a low-cost and low-power connectivity solution for low-power IoT devices.

8 Claims, 11 Drawing Sheets

(58) Field of Classification Search
CPC ..... H04W 72/56; H04W 76/27; H04W 24/08; H04W 52/146; H04W 52/16; H04W 52/365; H04W 76/14; H04W 36/08
USPC .............................................................. 455/7
See application file for complete search history.

(56) References Cited

U.S. PATENT DOCUMENTS

| | | | | |
|---|---|---|---|---|
| 2024/0204398 | A1* | 6/2024 | Zhu | H01Q 3/22 |
| 2025/0323689 | A1* | 10/2025 | Jagyasi | H04B 7/0626 |

FOREIGN PATENT DOCUMENTS

| | | | |
|---|---|---|---|
| WO | 2022/193048 | A1 | 9/2022 |
| WO | 2022/197378 | A1 | 9/2022 |
| WO | 2022/211884 | A1 | 10/2022 |

OTHER PUBLICATIONS

Wu et al., "Intelligent reflecting surface-aided wireless communications: A tutorial", IEEE Transactions on Communications, vol. 69, No. 5, May 2021, pp. 3313-3351.
Guo et al., "Dynamic blockage pre-avoidance using reconfigurable intelligent surfaces", arXiv, Jan. 17, 2022, pp. 1-7.
"3rd Generation Partnership Project; Technical Specification Group Radio Access network; Study on NR network-controlled repeaters; (Release 18)", 3GPP TR 38.867, V1.0.0, Sep. 2022, 19 pages.
Pan et al., "Intelligent Reflecting Surface Aided MIMO Broadcasting for Simultaneous Wireless Information and Power Transfer", arXiv, Feb. 18, 2020, pp. 1-33.
Extended European Search Report received for corresponding European Patent Application No. 23210583.3, dated May 10, 2024, 9 pages.
Wang et al., "Joint Beam Training and Positioning For Intelligent Reflecting Surfaces Assisted Millimeter Wave Communications", arXiv, Jan. 12, 2021, pp. 1-16.

* cited by examiner

600

FOR BS-RIS ACTIVE ELEMENTS

FOR UE-RIS ACTIVE ELEMENTS

620

662

666

BS-RIS CONTROL LINK

630

652

664

668

650

654

656

UE-RIS CONTROL LINK TO REACH LOW ENERGY UEs

658

640

610

700

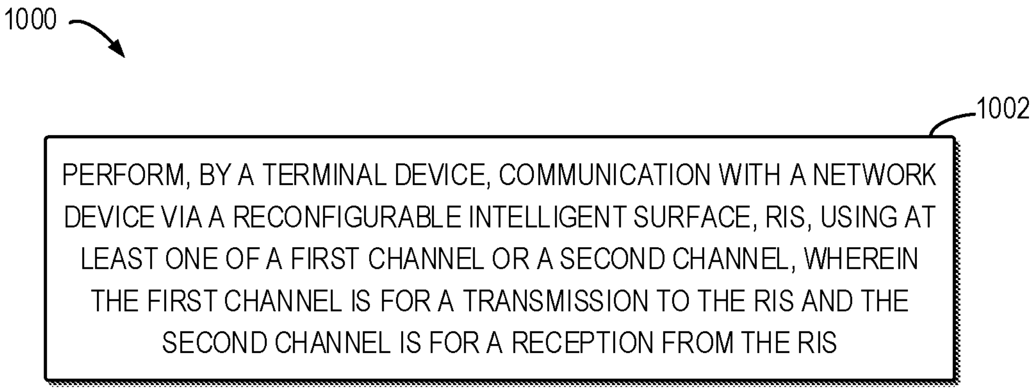

ENGAGE IN, BY A RECONFIGURABLE INTELLIGENT SURFACE, RIS, COMMUNICATION BETWEEN A TERMINAL DEVICE AND A NETWORK DEVICE, USING AT LEAST ONE OF A FIRST CHANNEL OR A SECOND CHANNEL, WHEREIN THE FIRST CHANNEL IS FOR A RECEPTION FROM THE TERMINAL DEVICE AND THE SECOND CHANNEL IS FOR A TRANSMISSION TO THE TERMINAL DEVICE

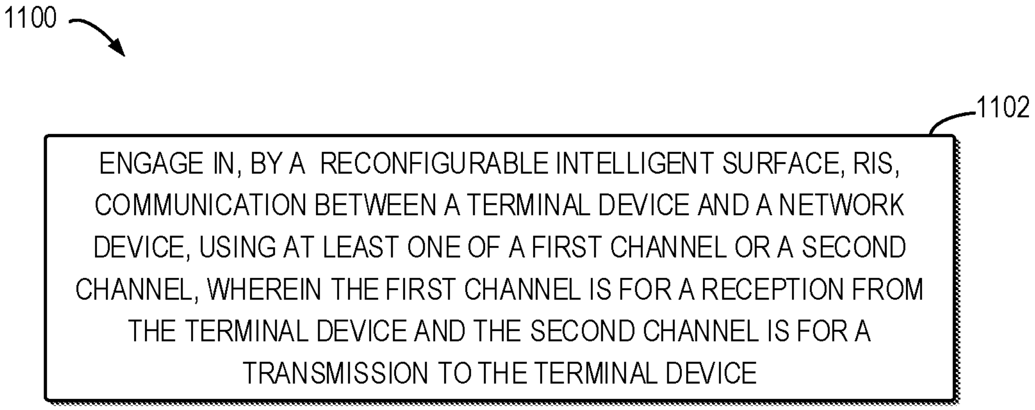

PERFORM, BY A NETWORK DEVICE, COMMUNICATION WITH A TERMINAL DEVICE VIA A RECONFIGURABLE INTELLIGENT SURFACE, RIS

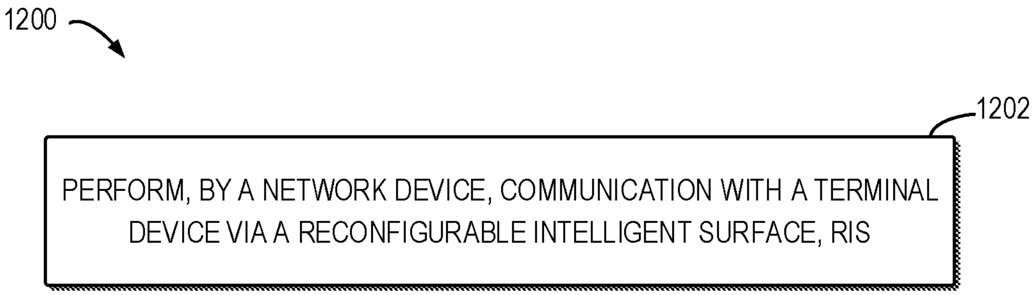

Fig. 12

RECONFIGURABLE INTELLIGENT SURFACE ASSISTED COMMUNICATION

FIELD

Example embodiments of the present disclosure generally relate to the field of telecommunication, and in particular, to apparatuses, methods, and a computer readable storage medium for reconfigurable intelligent surfaces (RIS) assisted communication, for example, RIS assisted blockage avoidance for low power internet of things (IoT) devices.

BACKGROUND

The use of passive IoT devices, i.e., devices that are battery-less or devices that have batteries but don't need battery replacement over the lifetime of the device are being studied within the 3GPP framework. For example, in a current Rel-19 study item in SA and a potential Rel-19 RAN study item. These devices are expected to have lower complexity, data rate, coverage, cost, and energy consumption than narrow band IoT (NB-IoT)/enhanced machine-type communication (eMTC). The use cases for passive IoT devices include identification, tracking, monitoring, sensing, logistics and supply chain management, transportation, manufacturing (factory automation), healthcare, energy, agriculture, transportation, smart cities, environment, extreme conditions, hazardous environments in some use cases, and environments where devices with batteries is not an option.

The link quality between a next generation NodeB (gNB) and an IoT device can be reduced due to various factors such as blockage, mobility in environment, weather and device relocation. For a low-power IoT device, this means that the device may go completely offline from the gNB point of view due to its low transmit power, while an NR device can still be reachable due to its high transmission power. For example, a gNB and an IoT device are obstructed by an obstacle. As a result, more signal power is needed to transmit data in the uplink. Low-power devices (such as IoT devices with low energy availability) may not be able to meet this requirement, in which case communication may fail.

SUMMARY

In general, example embodiments of the present disclosure provide a solution for RIS assisted communication, for example, RIS assisted blockage avoidance for low power IoT devices. Specifically, the solution can help reconnecting an IoT device with the network that has lost its connection with a gNB by using an RIS.

In a first aspect, there is provided an apparatus. The apparatus may comprise at least one processor; and at least one memory storing instructions that, when executed by the at least one processor, cause the apparatus to: perform communication with a network device via a RIS, using at least one of a first channel or a second channel, wherein the first channel is for a transmission to the RIS and the second channel is for a reception from the RIS.

In a second aspect, there is provided an apparatus. The apparatus may comprise at least one processor; and at least one memory storing instructions that, when executed by the at least one processor, cause the apparatus to: engage in communication between a terminal device and a network device, using at least one of a first channel or a second channel, wherein the first channel is for a reception from the terminal device and the second channel is for a transmission to the terminal device.

In a third aspect, there is provided an apparatus. The apparatus may comprise at least one processor; and at least one memory storing instructions that, when executed by the at least one processor, cause the apparatus to: perform communication with a terminal device via a RIS.

In a fourth aspect, there is provided a method at a terminal device. The method may comprise performing communication with a network device via a RIS, using at least one of a first channel or a second channel, wherein the first channel is for a transmission to the RIS and the second channel is for a reception from the RIS.

In a fifth aspect, there is provided a method at a RIS. The method may comprise engaging in communication between a terminal device and a network device, using at least one of a first channel or a second channel, wherein the first channel is for a reception from the terminal device and the second channel is for a transmission to the terminal device.

In a sixth aspect, there is provided a method at a network device. The method may comprise performing communication with a terminal device via a RIS.

In a seventh aspect, there is provided an apparatus. The apparatus may comprise: means for performing communication with a network device via a RIS, using at least one of a first channel or a second channel, wherein the first channel is for a transmission to the RIS and the second channel is for a reception from the RIS.

In an eighth aspect, there is provided an apparatus. The apparatus may comprise: means for engaging in communication between a terminal device and a network device, using at least one of a first channel or a second channel, wherein the first channel is for a reception from the terminal device and the second channel is for a transmission to the terminal device.

In a ninth aspect, there is provided an apparatus. The apparatus may comprise: means for performing communication with a terminal device via a RIS.

In a tenth aspect, there is provided a non-transitory computer readable medium comprising program instructions that, when executed by an apparatus, cause the apparatus to perform at least the following: performing communication with a network device via a RIS, using at least one of a first channel or a second channel, wherein the first channel is for a transmission to the RIS, and the second channel is for a reception from the RIS.

In an eleventh aspect, there is provided a non-transitory computer readable medium comprising program instructions that, when executed by an apparatus, cause the apparatus to perform at least the following: engaging in communication between a terminal device and a network device, using at least one of a first channel or a second channel, wherein the first channel is for a reception from the terminal device and the second channel is for a transmission to the terminal device.

In a twelfth aspect, there is provided a non-transitory computer readable medium comprising program instructions that, when executed by an apparatus, cause the apparatus to perform at least the following: performing communication with a terminal device via a RIS.

In an thirteenth aspect, there is provided a computer program comprising instructions, which, when executed by an apparatus, cause the apparatus at least to: perform communication with a network device via a RIS, using at least one of a first channel or a second channel, wherein the first channel is for a transmission to the RIS and the second channel is for a reception from the RIS.

In a fourteenth aspect, there is provided a computer program comprising instructions, which, when executed by an apparatus, cause the apparatus at least to: engage in communication between a terminal device and a network device using at least one of a first channel or a second channel, wherein the first channel is for a reception from the terminal device and the second channel is for a transmission to the terminal device.

In a fifteenth aspect, there is provided a computer program comprising instructions, which, when executed by an apparatus, cause the apparatus at least to: perform communication with a terminal device via a RIS.

In a sixteenth aspect, there is provided an apparatus. The apparatus comprises performing circuitry configured to: perform communication with a network device via a RIS, using at least one of a first channel or a second channel, wherein the first channel is for a transmission to the RIS and the second channel is for a reception from the RIS.

In a seventeenth aspect, there is provided an apparatus. The apparatus comprises engaging circuitry configured to: engage in communication between a terminal device and a network device, using at least one of a first channel or a second channel, wherein the first channel is for a reception from the terminal device and the second channel is for a transmission to the terminal device.

In an eighteenth aspect, there is provided an apparatus. The apparatus comprises performing circuitry configured to: perform communication with a terminal device via a RIS.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which:

FIG. 10 illustrates an example flowchart of a method implemented at a terminal device in accordance with some example embodiments of the present disclosure;

FIG. 11 illustrates an example flowchart of a method implemented at a RIS in accordance with some example embodiments of the present disclosure;

FIG. 12 illustrates an example flowchart of a method implemented at a network device in accordance with some example embodiments of the present disclosure;

Throughout the drawings, the same or similar reference numerals represent the same or similar elements.

DETAILED DESCRIPTION

Figure 1A:
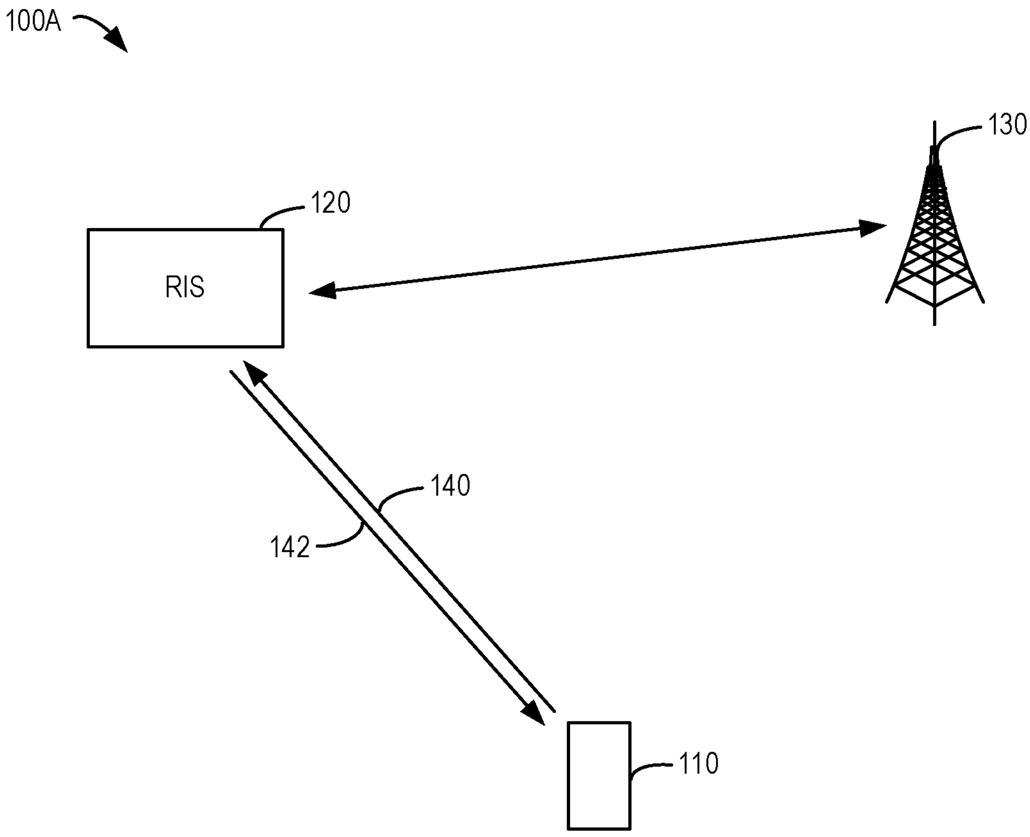
FIG. 1A illustrates an example environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "resource", "transmission resource", "resource block", "physical resource block" (PRB), "uplink (UL) resource" or "downlink (DL) resource" may refer to any resource for performing a communication, for example, a communication between a terminal device and a network device, such as a resource in time domain, a resource in frequency domain, a resource in space domain, a resource in code domain, a resource in a combination of more than one domain or any other resource enabling a communication, and the like. In the following, a resource in time domain (such as, a subframe) will be used as an example of a transmission resource for describing some example embodiments of the present disclosure. It is noted that example embodiments of the present disclosure are equally applicable to other resources in other domains.

For a low-power IoT device, the link quality between a base station and an IoT device can be reduced due to various factors such as blockage, mobility in environment, weather and device relocation. This means that the IoT device may go completely offline from the gNB point of view due to its low transmit power, while a new radio (NR) device can still be reachable due to its high transmission power.

In a scenario that some IoT devices are obstructed by an obstacle or obstacles, more signal power is needed to transmit data in the uplink. Low-power devices (such as IoT devices with low energy availability) may not be able to meet this requirement, in which case communication may fail.

It is known that the design targets of passive IoT devices may include one of the following: improved link budget compared to existing RFID solutions, frequency bands for global useability, ultra-low-cost, no need for battery charging or replacement (enabling low maintenance long life cycle operation), ultra-low-power (e.g., <100 micro-Watts, to enable operation with back-scattering or energy harvesting), small device size, form-factor, positioning accuracy (e.g., 3-5 m), data rate (e.g., 10-100 kbps), energy source: passive devices: use of backscattering techniques, semi-passive devices: devices operating with energy harvesting or with a very small battery (e.g., <100 mAh), or mobile originated and mobile terminated data.

As per 3GPP, the following areas need enhancement to support passive IoT devices: 1) simplified and adaptive procedures for operation with intermittently available energy and interrupted connections, e.g., RA procedure, RRC protocol/RRC states handling; 2) light-weight protocol for ultra-low power consumption; 3) energy neutral sustainable operation of devices.

A RIS can be used for blockage avoidance. A RIS consists of a planar array of passive reflecting elements that can reflect the incoming rays with adjustable phase shifts and gains. The passive nature of the reflecting elements results in low hardware costs, low energy consumption, and the ability to naturally operate in full-duplex (FD) mode. A RIS will be a low-profile auxiliary device that can be easily integrated into an existing communication network transparently, providing great flexibility and compatibility in terms of deployment.

However, the conventional methods proposed are not applicable to low-power IoT devices due to the limited transmit power of these devices. The conventional methods focus on how to use a RIS to overcome performance degradation due to blockages. For IoT devices, even control signals may not be reachable, and hence they will get completely disconnected from the network.

Therefore, the present disclosure proposes a solution for reconnecting a low-power IoT device with the network that has completely lost its connection with a network device by using an intermediate RIS.

Example embodiments of the present disclosure provide a solution for utilizing a RIS with active elements to overcome a blockage between a gNB and a low-power user equipment (UE), where a novel dedicated control link (also referred to UE assistance channel (UEAC)) is proposed for communication between the RIS and UE. The purpose of this control channel is to enable the UE to directly communicate with the RIS, in case gNB is not reachable from UE. Principles and some example embodiments of the present disclosure will be described in detail below with reference to the accompanying drawings.

FIG. 1A illustrates an example environment 100A in which example embodiments of the present disclosure may be implemented. In the descriptions of the example embodiments of the present disclosure, the environment 100A comprises a terminal device 110. The environment 100A further comprises a RIS 120. The environment 100A further comprises a network device 130. In some example embodiments, the terminal device 110 may be an IoT device, a low-power IoT device or a passive IoT device. In some example embodiments, the network device 130 may be a gNB or a BS.

The terminal device 110 may be also referred to a UE 110 or an IoT device 110. The network device 130 may be also referred to a BS 130 or a gNB 130. The terminal device 110 communicates with the network device 130 via the RIS 120. The terminal device 110 transmits data using a first channel 140 to the RIS 120. The terminal device 110 receives data using a second channel 142 from the RIS 120. The RIS 120 communicates with the network device 130. There is no direct communication between the terminal device 110 and the network device 130.

Various aspects of example embodiments will be described in the context of communications between one terminal device and one network device via one RIS. It should be appreciated, however, that the description herein may be applicable to other types of apparatus or other similar apparatuses that are referenced using other terminology.

Figure 1B:
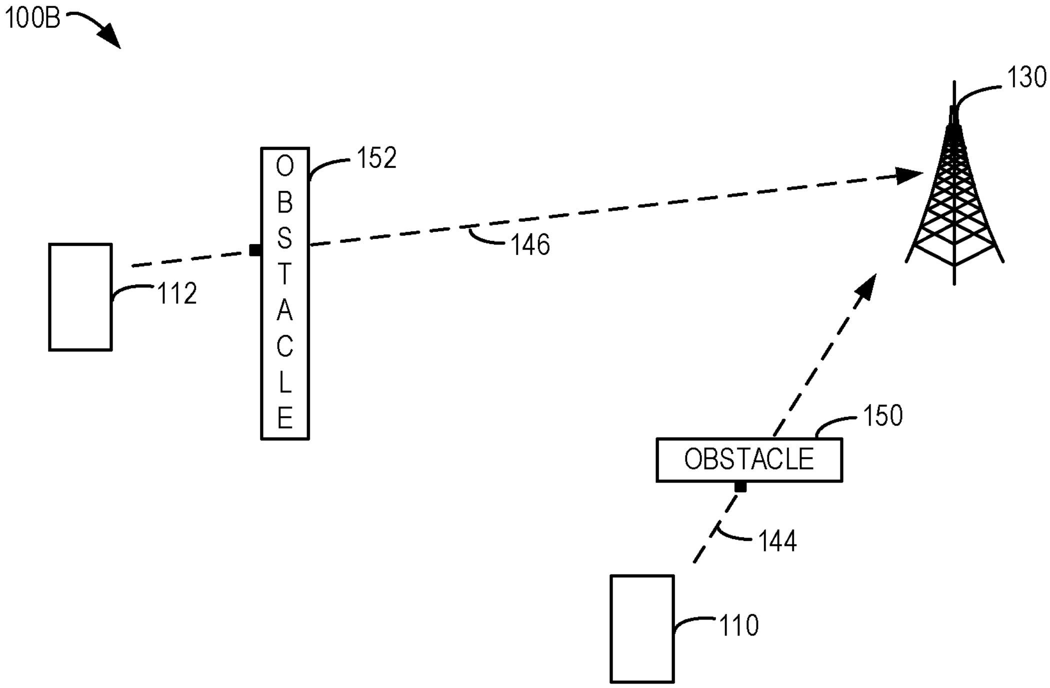
FIG. 1B illustrates an example environment of obstacles in which example embodiments of the present disclosure may be implemented.

Reference is made to FIG. 1B, which illustrates an example environment 100B of obstacles in which example embodiments of the present disclosure may be implemented. The environment 100B may comprise the terminal device 110 and another terminal device 112. The environment 100B may further comprise the network device 130. The environment 100B may further comprise an obstacle 150 and an obstacle 152. The obstacle 150 may block the signal 144 transmitted by the terminal device 110. The obstacle 152 may block the signal 146 transmitted by the terminal device 112. Therefore, the network device 130 may have lost connection with the terminal device 110. The network device 130 also may have lost connection with the terminal device 112.

Figure 1C:
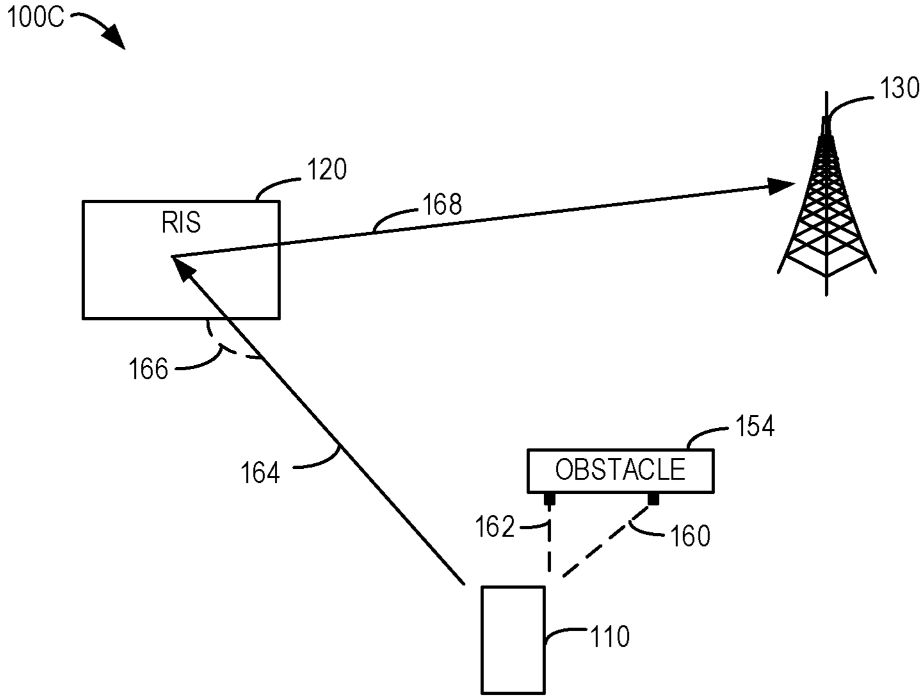
FIG. 1C illustrates an example environment of an obstacle and a RIS in which example embodiments of the present disclosure may be implemented.

Reference is made to FIG. 1C, which illustrates an example environment 100C of an obstacle and a RIS in which example embodiments of the present disclosure may be implemented. Environment 100C depicts a scenario where a RIS is used to overcome an obstacle by redirecting signals from UE toward the BS. It is assumed that either the RIS is not blocked by an obstacle as well or, if it is blocked, the IoT device can still communicate with the RIS due to the proximity of the RIS.

The environment 100C may comprise the terminal device 110. The environment 100C may further comprise the RIS 120. The environment 100C may further comprise the network device 130. The environment 100C may further comprise an obstacle 154. The signal 160 transmitted by the terminal device 110 may be blocked by the obstacle 154. The signal 162 with another direction transmitted by the terminal device 110 may be blocked by the obstacle 154. Therefore, the terminal device 110 may be not reachable from the network device 130.

In this case, the terminal device 110 may send signal 164 at an angle 166 to the RIS 120. The RIS may transmit the received signal 168 to the network device 130. As such, the RIS 120 can help reconnecting the terminal device 110 with the network device 130.

Figure 2:
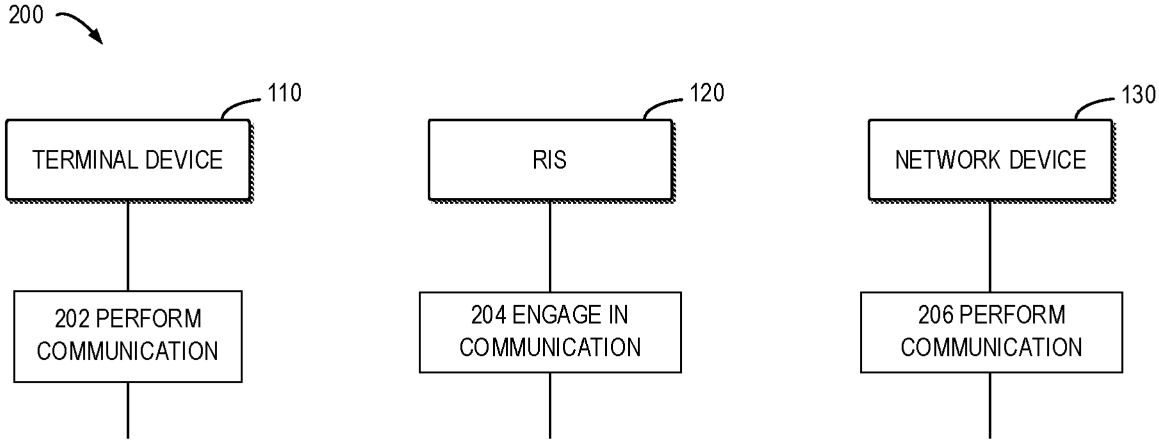
FIG. 2 illustrates an example signaling process for RIS assisted blockage avoidance for low power IoT devices in accordance with some embodiments of the present disclosure.

Reference is made to FIG. 2, which illustrates example signaling process 200 for RIS assisted blockage avoidance for low power IoT devices in accordance with some embodiments of the present disclosure. In FIG. 2, the terminal device 110, the RIS 120 and the network device 130 are taken as an example to illustrate the example process. However, it is just for illustrative purposes without limiting the present disclosure in any way.

At block 202, the terminal device 110 performs communication with a network device 130 via a RIS 120, using at least one of a first channel or a second channel, wherein the first channel is for a transmission to the RIS 120 and the second channel is for a reception from the RIS 120.

In some example embodiments, the terminal device 110 may be caused to: transmit, to the RIS 120 via the first channel, an indication of a detection of blockage of signals from the network device 130 to the terminal device 110.

In some example embodiments, the terminal device 110 may be further caused to: transmit, to the RIS 120 via the first channel, an indication to assist with communications between the terminal device 110 and the network device 130.

In some example embodiments, the terminal device 110 may be further caused to: receive, from the RIS 120 via the second channel, an indication indicating that the terminal device 110 is to be connected with the RIS 120.

In some example embodiments, the indication may comprise at least one of a preamble, a msgA or an identifier of the terminal device 110.

In some example embodiments, the terminal device 110 may be further caused to: receive, from the RIS 120 via the second channel, a message indicating that a phase reconfiguration of the RIS 120 is completed.

In some example embodiments, the terminal device 110 may be further caused to: transmit, to the RIS 120 via the first channel, a reference signal.

In some example embodiments, the first channel and the second channel may be a same channel.

By means of such proposed solution as proposed herein, it is possible to provide the ability to reach blocked low-power IoT devices by using a novel dedicated control link (the first channel and the second channel, which is also referred to UE assistance channel (UEAC) as a whole) for communication between the RIS and UE. It is also provided low-cost and low-power connectivity solutions for low-power IoT devices.

At block 204, the RIS 120 engages in communication between a terminal device 110 and a network device 130, using at least one of a first channel or a second channel, wherein the first channel is for a reception from the terminal device 110 and the second channel is for a transmission to the terminal device 110.

In some example embodiments, the RIS 120 may be caused to: receive, from the terminal device 110 via the first channel, an indication of a detection of blockage of signals from the network device 130 to the terminal device 110.

In some example embodiments, the RIS 120 may be further caused to: transmit, to the terminal device 110 via the second channel, an indication indicating that the terminal device 110 is to be connected with the RIS 120.

In some example embodiments, the RIS 120 may be further caused to: receive a reference signal via the first channel for channel sensing; and forward at least one measurement of the reference signal to the network device 130.

In some example embodiments, the RIS 120 may be further caused to: receive a request from the network device 130, wherein the request is related to the terminal device 110 accessing the RIS 120; transmit a response signal, in response to the request; and switch to a sensing mode, based on transmitting the response signal.

In some example embodiments, the request may further comprise at least one of: a configuration of the terminal device 110; or location information of the terminal device 110.

In some example embodiments, the indication may comprise at least one of a preamble, a msgA or an identifier of the terminal device 110.

In some example embodiments, the RIS 120 may be further caused to: transmit a request to the network device 130, wherein the request is related to a terminal device 110 accessing the RIS 120, receive a response signal from the network device 130; and switch to a sensing mode, based on receiving the response signal.

In some example embodiments, the request may further comprise an identifier of the terminal device 110.

In some example embodiments, the RIS 120 may be further caused to: transmit, to the terminal device 110 via the second channel, a message indicating that a phase reconfiguration of the RIS 120 is completed.

In some example embodiments, a first set of active elements of the RIS 120 may be used for the first channel or the second channel. In some example embodiments, a second set of active elements of the RIS 120 may be used for communications between the RIS 120 and the network device 130.

In some example embodiments, the first channel and the second channel may be a same channel.

At block 206, the network device 130 performs communication with a terminal device 110 via a RIS 120.

In some example embodiments, the network device 130 may be further caused to: receive, from the RIS 120, an indication that the terminal device 110 detects blockage of signals from the network device 130. In some example embodiments, the network device 130 may be further caused to: determine that the terminal device 110 is blocked from the network device 130 based on a criterion check.

In some example embodiments, the network device 130 may be further caused to: transmit, to the RIS 120, a request, wherein the request is related to the terminal device 110 accessing the RIS 120; and receive a response signal from the RIS 120.

In some example embodiments, the request may further comprise at least one of: a configuration of the terminal device 110; or location information of the terminal device 110.

In some example embodiments, the network device 130 may be further caused to: receive, from the RIS 120, a request, wherein the request is related to the terminal device 110 accessing the RIS 120; and receive a response signal from the RIS 120.

In some example embodiments, the request may further comprise an identifier of the terminal device 110.

Figure 3:
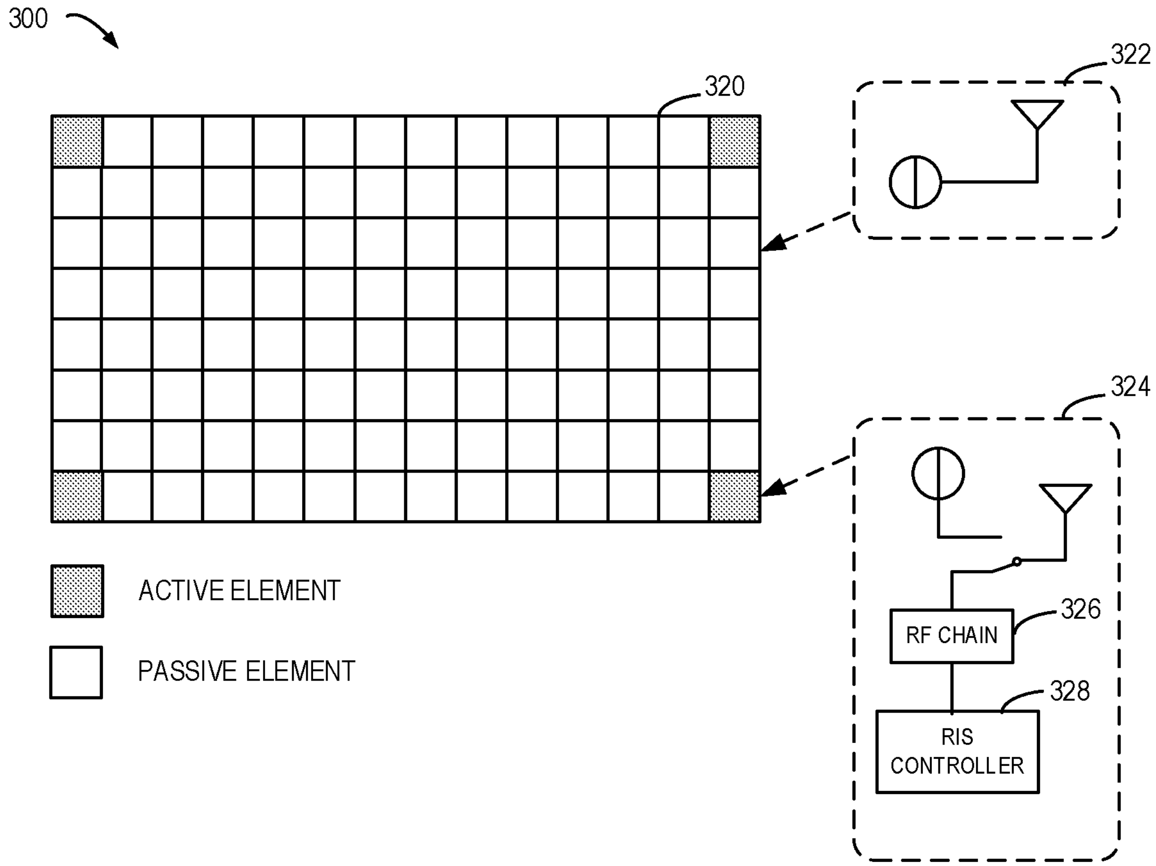
FIG. 3 illustrates an example architecture of a RIS in accordance with some embodiments of the present disclosure.

Reference is made to FIG. 3, which illustrates an example architecture 300 of a RIS in accordance with some embodiments of the present disclosure. FIG. 3 describes an example architecture of a RIS. The RIS 120 in FIGS. 1A and 1C, the RIS 120 in FIG. 2, and any RIS mentioned hereafter may have the example architecture 300. The architecture 300 may comprise a RIS 320. The RIS 320 may comprise passive elements (such as passive elements 322) and active elements (such as active elements 324).

It is known that the wireless propagation environment is random and uncontrollable. Recently, RISs have been proposed as a means of having some control over them with the help of software-controlled reflections. The RIS 320 may consist of a planar array of passive reflecting elements that can reflect the incoming rays with adjustable phase shifts and gains. The passive nature of the reflecting elements results in low hardware costs, low energy consumption, and the ability to naturally operate in full-duplex (FD) mode. The RIS 320 may be a low-profile auxiliary device that can be easily integrated into an existing communication network transparently, providing great flexibility and compatibility in terms of deployment. These passive elements 322 may reflect the incoming signals. Phases of the passive elements 322 may be configured to reflect the incoming signal in the desired direction.

In addition to passive elements 322, the RIS 320 may have reconfigurable active elements 324, where it can be connected to a RF chain 326 by a switch as shown in FIG. 3. These active elements 324 may be controlled by a RIS controller 328. These active elements 324 may be used for different functions such as communicating control messages between a RIS and s BS. These active elements 324 also may be used for channel sensing by measuring reference signals.

Figure 4:
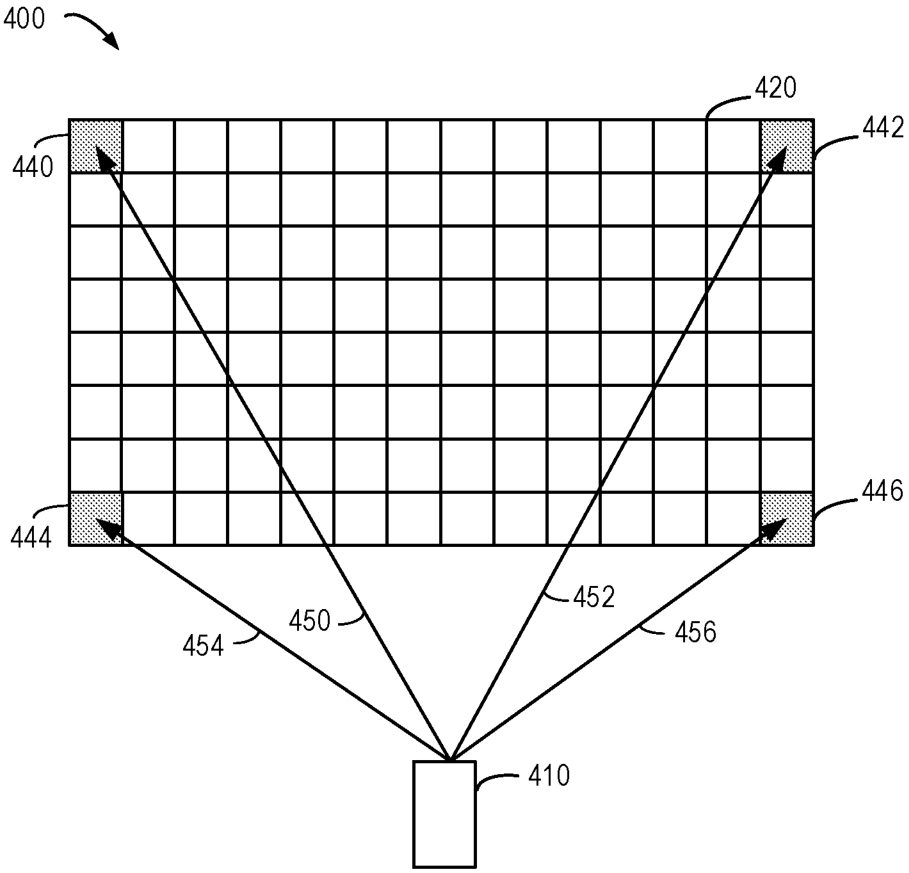
FIG. 4 illustrates an example illustration of a RIS in sensing mode in accordance with some embodiments of the present disclosure.

Reference is made to FIG. 4, which illustrates an example illustration 400 of a RIS in sensing mode in accordance with some embodiments of the present disclosure. As shown in FIG. 4, in the sensing mode, active sensors in RIS may be activated for channel sensing. Incoming reference signals sent by the terminal device may be measured by the active elements.

As an example, the RIS 420 may comprise active elements 440, 424, 444 and 446. The terminal device 410 may send reference signal 450 to the active element 440. The terminal device 410 may send reference signal 452 to the active element 442. The terminal device 410 may send reference signal 454 to the active element 544. The terminal device 410 may send reference signal 456 to the active element 446.

Figure 5:
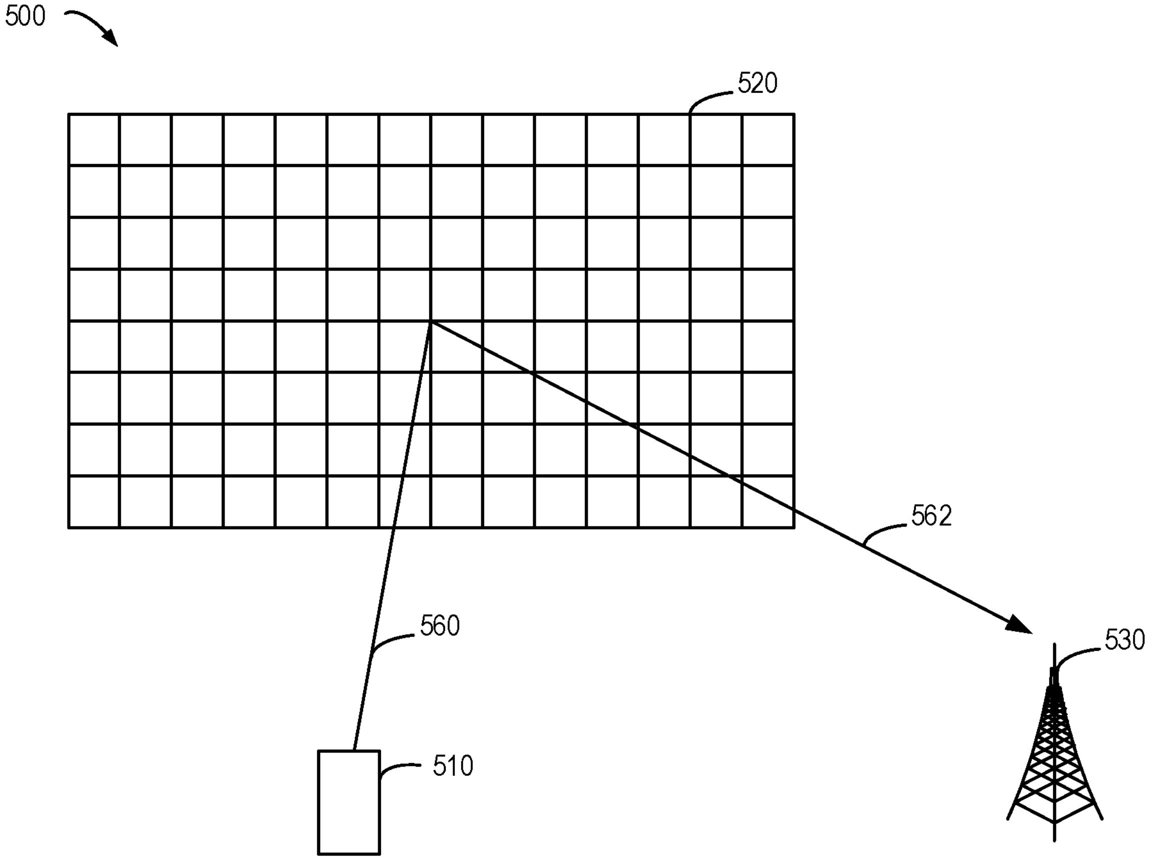
FIG. 5 illustrates an example illustration of a RIS in reflecting mode in accordance with some embodiments of the present disclosure.

Reference is made to FIG. 5, which illustrates an example illustration 500 of a RIS in reflecting mode in accordance with some embodiments of the present disclosure. As shown in FIG. 5, in the reflecting mode, which is also referred to an energy reflection mode, all elements (including active elements) may be configured as passive elements. The reflection matrix may be optimized to redirect the incoming signals, hence avoiding blockages.

As an example, The RIS 520 may be configured with passive elements. The terminal device 510 may send reference signal 560 to the RIS 520. The reference signal 560 may be reflected by the RIS 520 towards the network device 530. For the purpose of clarity, the reflected reference signal 560 is referred to a signal 562 in FIG. 5.

Figure 6:
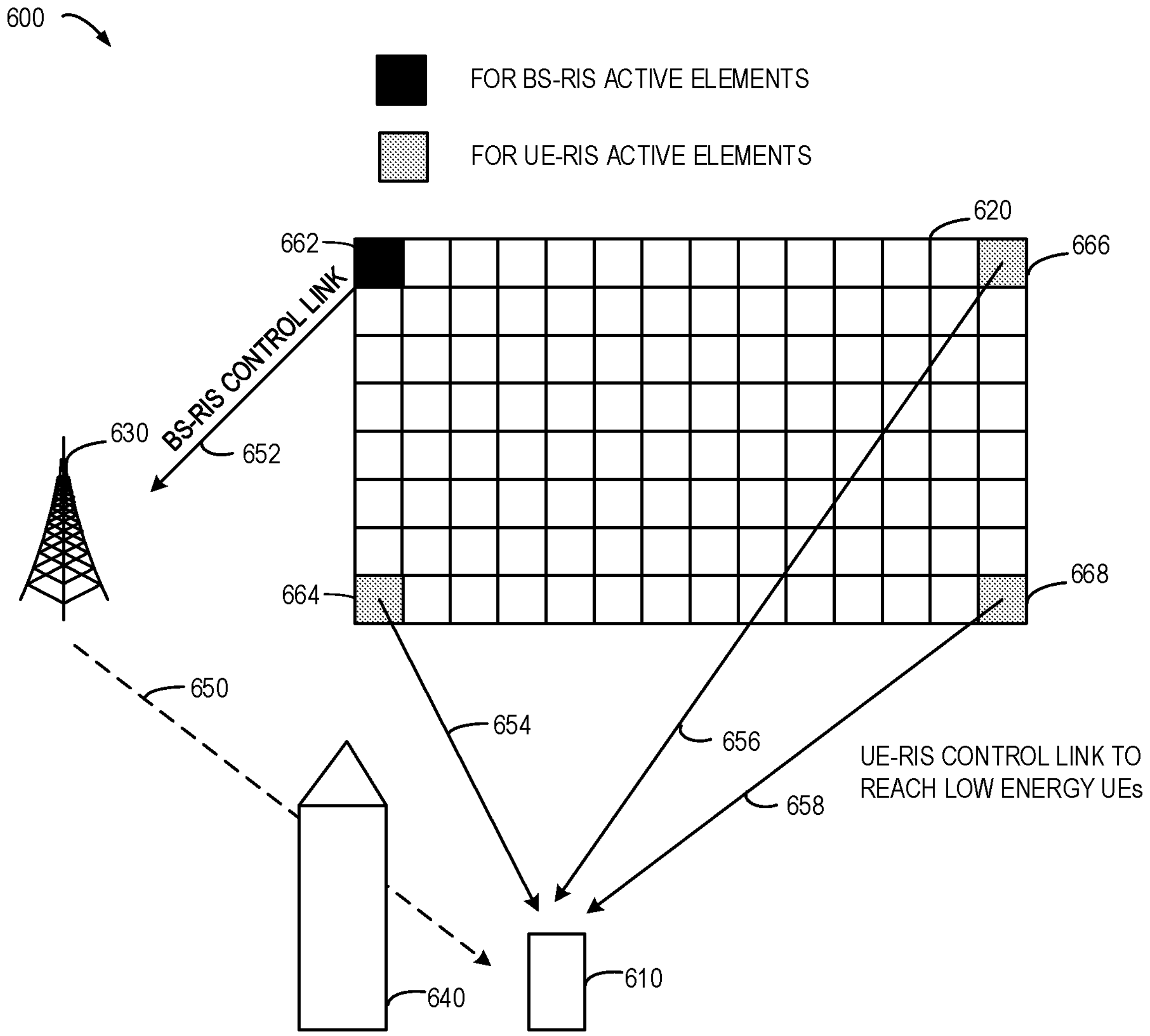
FIG. 6 illustrates an example allocation of RIS elements in accordance with some embodiments of the present disclosure.

Reference is made to FIG. 6, which illustrates an example allocation 600 of RIS elements in accordance with some embodiments of the present disclosure. In FIG. 6, signal 650 from the gNB 630 may be blocked by an obstacle 640. Some active elements may be allocated specifically for the control channel between a RIS and a UE, while the remaining active elements may be used for the BS-RIS control link 652. The main purpose of the UE-RIS control link (such as control channels 654, 656 and 658) is to reach a low-power device (which has lost connection with gNB) and locate it with minimum overhead.

As an example shown in FIG. 6, direct communications between the UE 610 and the gNB 63 may be blocked by an obstacle 640. Three active elements 664, 666 and 668 out of four active elements in the RIS 620 may be allocated for the UE-RIS control channel. They may be used to connect to a UE 610, upon which the UE 610 may send a reference signal and the RIS 620 may forward reference signal to the gNB 630 to estimate the position of UE 610 based on this reference signal. Finally, RIS elements' phases may be adjusted to enable communication between gNB 630 and UE 610 through RIS 620.

Figure 7:
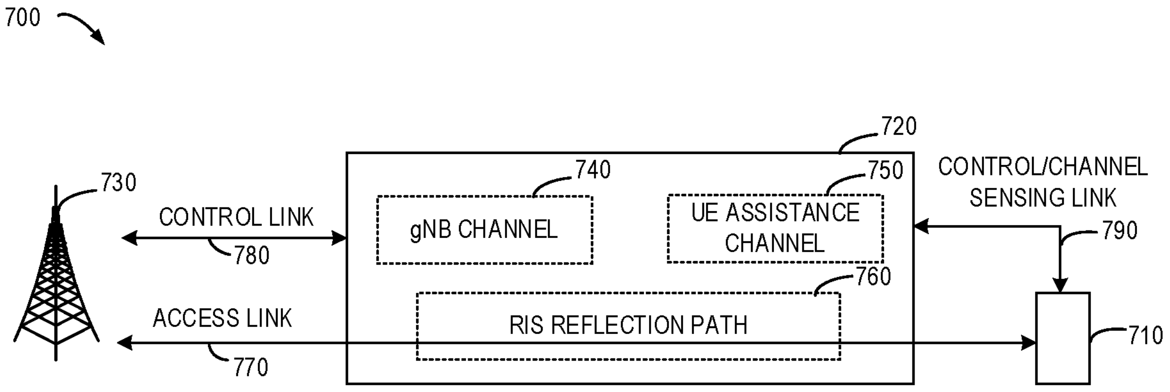
FIG. 7 illustrates an example architecture of a standalone RIS in accordance with some embodiments of the present disclosure.

Reference is made to FIG. 7, which illustrates an example architecture 700 of a standalone RIS in accordance with some embodiments of the present disclosure. As shown in FIG. 7, gNB control 740 may be defined as a functional entity to communicate with gNB 730 via a control link 780. RIS reflection path 760 may be the radio link through passive RIS elements. In addition to gNB control 740, UE assistance channel 750 may be defined to connect with a UE for channel sensing. UE assistance channel 750 further may be defined to forward reference signals sent by a UE to gNB.

Configuration of UEAC 750 may be done by gNB. For example, when requesting RIS 720 to connect to UE 710, gNB 730 may forward UE configuration to RIS 720 (such as limited UE-specific information (e.g., UE-specific scrambling ID) in addition to other cell-specific information). This enables RIS 720 to communicate with UE 710 on the UEAC 750 without any configuration procedure between UE 710 and RIS 720. However, proper security mechanisms need to be implemented to guarantee both UE and RIS are legitimate. Upon receiving the reference signal from UE 710, RIS 720 may measure the signal strength using its active elements to calculate the angle of arrival (AoA), or time of arrival (ToA).

Figure 8:
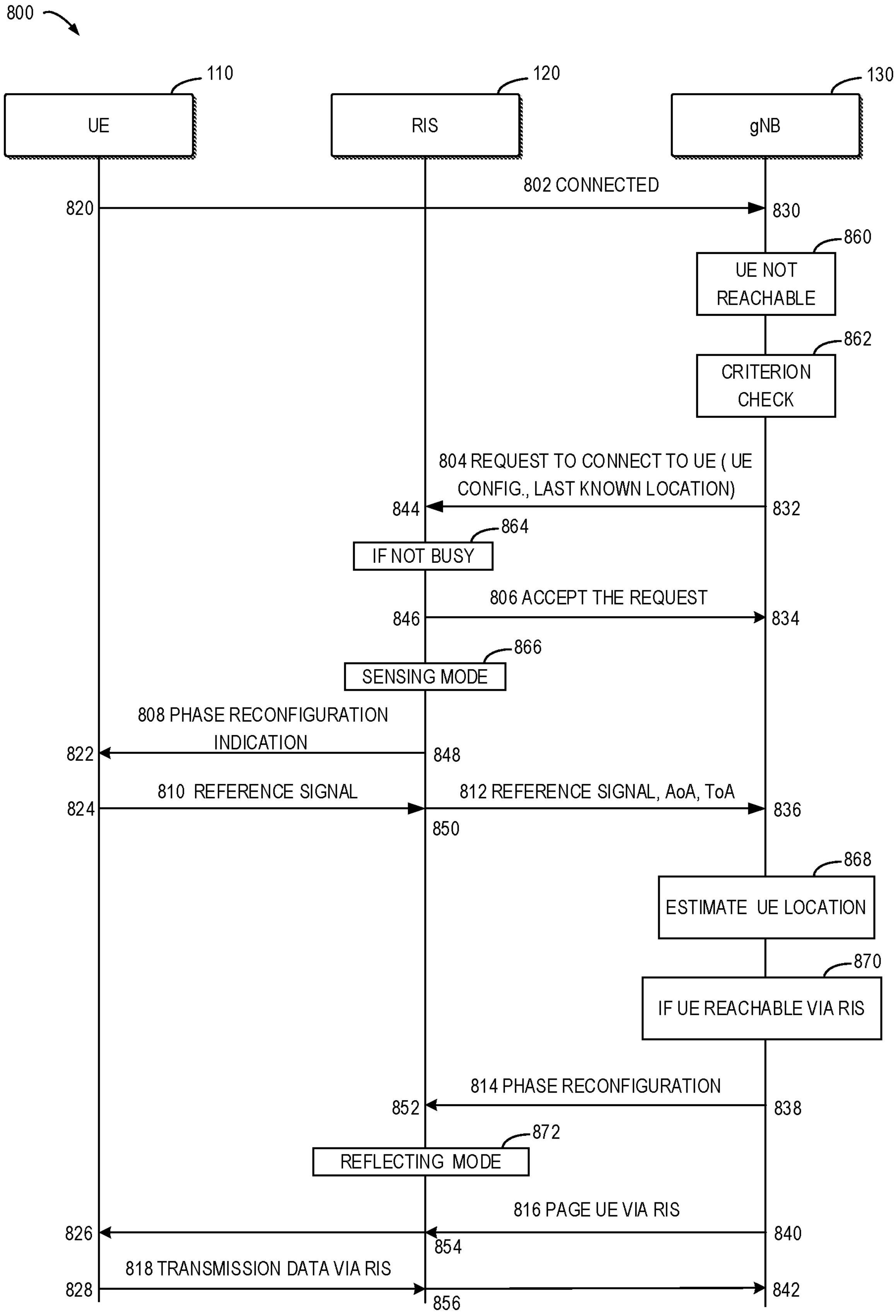
FIG. 8 illustrates an example signaling process for a network device initiated approach in accordance with some embodiments of the present disclosure.

Reference is made to FIG. 8, which illustrates an example signaling process 800 for a network device initiated approach in accordance with some embodiments of the present disclosure. The signalling of the phase reconfiguration procedure utilizing UEAC has two alternatives. FIG. 8 describes the gNB initiated blockage avoidance procedure.

At 830, the gNB 130 may page a UE 110 to initiate a connection or schedule an uplink transmission. At 820, UE may send a response. At 860, if no response is received from the UE 110, the gNB 130 may determine that the UE 110 is not reachable.

At 862, a criterion check may be made and the gNB 130 may decide if the RIS 120 is needed to be activated. For example, if the UE 110 previously reported energy status is high, the gNB 130 may start the blockage avoidance procedure.

At 832, the gNB 130 may request 804 RIS 120 to connect with the UE 110, the UE configuration and the last known position will be sent. At 844, the RIS 120 may receive the request from the gNB 130.

At 864, if RIS 120 is not busy, it may accept the request and go into sensing mode. At 846, the RIS 120 may accept 806 the request. At 834, the gNB may receive the request. At 866, the RIS may go into a sensing mode.

At 848, RIS UEAC may send a phase reconfiguration indication signal for a predetermined time based on UE configuration received from gNB 130 repeatedly covering a range of angles centered around the last known UE 110's location, until the UE 110 responds. At 822, the UE 110 may receive the phase reconfiguration indication.

At 824, the UE 110 may send 810 a reference signal. Based on the received power of the phase reconfiguration indication signal, the UE 110 may determine the duration of the reference signal. For example, it may transmit the signal for a longer duration or transmit repetitions of the signal if detects a weak link with the RIS.

At 848, the RIS 120 may forward 812 the UE 110's reference signal, AoA, and ToA to the gNB 130. At 836, the gNB 130 may receive the UE 110's reference signal, AoA, and ToA.

At 868, the gNB 130 may estimate UE 110's current location, for example, using similar information from other gNBs. At 870, the gNB 130 may decide if the UE 110 is reachable via the RIS 120 based on the received power, location estimation. At 838, the gNB 130 may send phase reconfiguration to the RIS 120 based on the reported AoA estimate. For example, the gNB 130 may decide what the best way to reach the UE 110 is. For example, the best way may be through another nearby gNB or RIS.

At 852, the RIS 120 may receive the phase reconfiguration. At 872, the RIS 120 may go into the reflecting mode. The RIS 120 may reconfigure its phase to reach the UE 110.

At 840, the gNB 130 may page the UE 110 via the reflected link through the RIS 120. At 828, the UE 110 may begin data transmission to the gNB 130 via the RIS 120. At 842, the gNB 130 may receive data transmitted from the UE 110 via the RIS 120.

Figure 9:
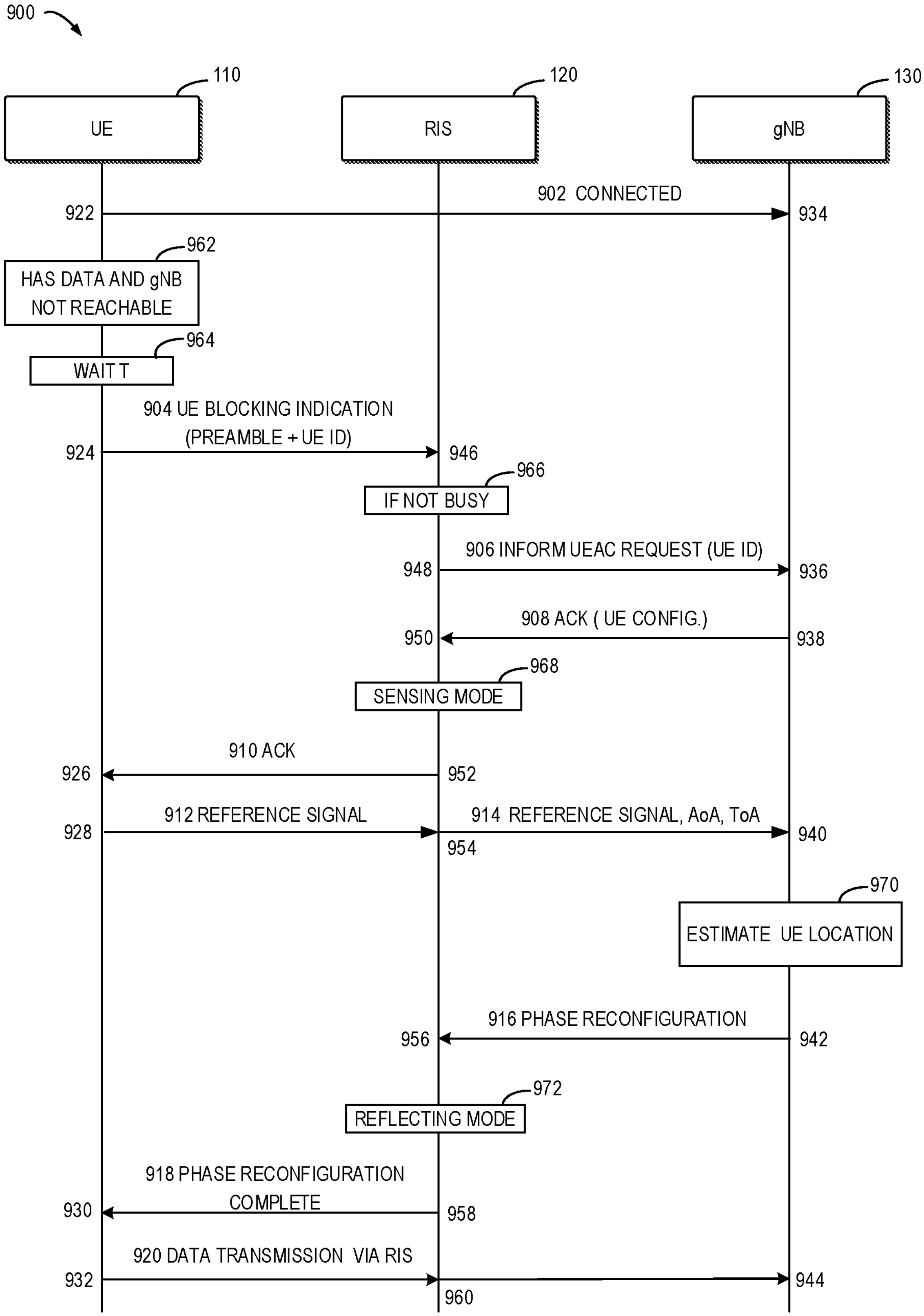
FIG. 9 illustrates an example signaling process for a terminal device initiated approach in accordance with some embodiments of the present disclosure.

Reference is made to FIG. 9, which illustrates an example signaling process 900 for a terminal device initiated approach in accordance with some embodiments of the present disclosure. FIG. 9 describes the UE initiated blockage avoidance procedure.

At 922, the UE 110 may be connected 902 with the gNB 130. At 962, if the UE 110 has data to send, it may perform an access attempt or send a scheduling request. If no response is received from the gNB 130, the UE 110 may start a timer and wait until time of T (blockage threshold time). At 964, the UE 110 may wait for T. The waiting time may be set in such a way that the UE 110 would go through the existing mechanisms for reattempting access or scheduling requests.

At 924, if within that time of T, the UE 110 does not receive a response from the gNB 130, the UE 110 may send 904 a UE blocking indication signal to the RIS 120 (such as a special preamble, UE ID in PUSCH, or a special msgA signal). It is assumed that the UE 110 is already aware of the presence of nearby RIS 120. For example, the presence may be provided by the gNB 130 in the initial configuration message.

At 946, the RIS 120 may receive the UE blocking indication. At 966, the RIS 420 is not busy. At 948, the RIS 120 may inform 906 the gNB 130 regarding the UEAC request with UE ID. At 936, the gNB may receive the UEAC request.

At 938, if the gNB 130 validates the RIS request, it may acknowledge 908 it with UE configuration. At 950, the RIS 120 may receive the UE configuration. At 968, the RIS 120 may go into the sensing mode. At 952, the RIS 120 may send 910 an acknowledgment to the UE 110. At 926, the UE 110 may receive the acknowledgment.

At 928, the UE 110 may send a reference signal to the RIS 120. Based on the received power of the acknowledgment signal, the UE 110 may determine the duration of the reference signal. For example, the UE 410 may transmit the signal for a longer duration or transmit repetitions of the signal if detects a weak link with the RIS 420.

At 954, the RIS 420 may forward 914 the reference signal, AoA, and ToA to the gNB 130. At 940, the gNB 130 may receive the reference signal, AoA, and ToA. At 970, the gNB 130 may estimate the UE 110's current location. At 942, the gNB 130 may send 916 a phase reconfiguration message to the RIS 120 based on the estimated UE location.

At 956, the RIS may receive the phase reconfiguration message. At 972, the RIS 120 may go into reflecting mode. The RIS 120 may reconfigure its phase to support a link to the UE 110 based on the estimated location. At 958, the RIS 120 may send a phase reconfiguration complete signal to the UE 110.

At 930, the UE 110 may receive the phase reconfiguration complete signal. At 932, the UE 110 may begin data transmission to the gNB 130 via the RIS 120. At 944, the gNB 130 may receive data transmitted from the UE 110 via the RIS 120.

In this manner, a RIS is used to serve energy harvesting devices. It can be contributed to SA1 Rel-18 studies on Passive IoT. This proposed solution is a low-cost and low-power connectivity solutions for low-power IoT devices compared to network-controlled repeaters. It can provide the ability to reach blocked low-power IoT devices by using a novel dedicated control link (UE assistance channel) for communication between the RIS and UE.

Reference is made to FIG. 10, which illustrates an example flowchart of a method 1000 implemented at a terminal device in accordance with some example embodiments of the present disclosure. The method 1000 is described with reference to FIG. 1A.

At block 1002, the terminal device 110 performs communication with a network device 130 via a RIS 120, using at least one of a first channel or a second channel, wherein the first channel is for a transmission to the RIS 120 and the second channel is for a reception from the RIS 120.

In some example embodiments, the terminal device 110 may transmit, to the RIS 120 via the first channel, an indication of a detection of blockage of signals from the network device 130 to the terminal device 110.

In some example embodiments, the terminal device 110 may transmit, to the RIS 120 via the first channel, an indication to assist with communications between the terminal device 110 and the network device 130.

In some example embodiments, the terminal device 110 may receive, from the RIS 120 via the second channel, an indication indicating that the terminal device 110 is to be connected with the RIS 120.

In some example embodiments, the indication may comprise at least one of a preamble, a msgA or an identifier of the terminal device 110.

In some example embodiments, the terminal device 110 may receive, from the RIS 120 via the second channel, a message indicating that a phase reconfiguration of the RIS 120 is completed.

In some example embodiments, the terminal device 110 may transmit, to the RIS 120 via the first channel, a reference signal.

In some example embodiments, the first channel and the second channel may be a same channel.

Reference is made to FIG. 11, which illustrates an example flowchart of a method 1100 implemented at a RIS in accordance with some example embodiments of the present disclosure. The method 1100 is described with reference to FIG. 1A.

At block 1102, the RIS 120 engages in communication between a terminal device 110 and a network device 130, using at least one of a first channel or a second channel, wherein the first channel is for a reception from the terminal device 110 and the second channel is for a transmission to the terminal device 110.

In some example embodiments, the RIS 120 may receive, from the terminal device 110 via the first channel, an indication of a detection of blockage of signals from the network device 130 to the terminal device 110.

In some example embodiments, the RIS 120 may transmit, to the terminal device 110 via the second channel, an indication indicating that the terminal device 110 is to be connected with the RIS 120.

In some example embodiments, the RIS 120 may receive a reference signal via the first channel for channel sensing; and forward at least one measurement of the reference signal to the network device 130.

In some example embodiments, the RIS 120 may receive a request from the network device 130, wherein the request is related to the terminal device 110 accessing the RIS 120; transmit a response signal, in response to the request; and switch to a sensing mode, based on transmitting the response signal.

In some example embodiments, the request may further comprise at least one of: a configuration of the terminal device 110; or location information of the terminal device 110.

In some example embodiments, the indication may comprise at least one of a preamble, a msgA or an identifier of the terminal device 110.

In some example embodiments, the RIS 120 may transmit a request to the network device 130, wherein the request is related to a terminal device 110 accessing the RIS 120, receive a response signal from the network device 130; and switch to a sensing mode, based on receiving the response signal.

In some example embodiments, the request may further comprise an identifier of the terminal device 110.

In some example embodiments, the RIS 120 may transmit, to the terminal device 110 via the second channel, a message indicating that a phase reconfiguration of the RIS 120 is completed.

In some example embodiments, a first set of active elements of the RIS 120 may be used for at least one of the first channel or the second channel. In some example embodiments, a second set of active elements of the RIS 120 may be used for communication between the RIS 120 and the network device 130.

In some example embodiments, the first channel and the second channel may be a same channel.

Reference is made to FIG. 12, which illustrates an example flowchart of a method 1200 implemented at a network device in accordance with some example embodiments of the present disclosure. The method 1200 is described with reference to FIG. 1A.

At block 1202, the network device 130 performs communication with a terminal device 110 via a RIS 120.

In some example embodiments, the network device 130 may receive, from the RIS 120, an indication that the terminal device 110 detects blockage of signals from the network device 130. In some example embodiments, the network device 130 may determine that the terminal device 110 is blocked from the network device 130 based on a criterion check.

In some example embodiments, the network device 130 may transmit, to the RIS 120, a request, wherein the request is related to the terminal device 110 accessing the RIS 120; and receive a response signal from the RIS 120.

In some example embodiments, the request may further comprise at least one of: a configuration of the terminal device 110; or location information of the terminal device 110.

In some example embodiments, the network device 130 may receive, from the RIS 120, a request, wherein the request is related to the terminal device 110 accessing the RIS 120; and receive a response signal from the RIS 120.

In some example embodiments, the request may further comprise an identifier of the terminal device 110.

By implementing the methods 1000, 1100 or 1200, it is possible to provide the ability to reach blocked low-power IoT devices by using a novel dedicated control link (the first channel and the second channel, which is also referred to UE assistance channel (UEAC) as a whole) for communication between the RIS and UE. It is also provided low-cost and low-power connectivity solutions for low-power IoT devices.

In some example embodiments, an apparatus capable of performing the method 1000 may comprise means for performing the respective steps of the method 1000. The means may be implemented in any suitable form. For example, the means may be implemented in a circuitry or software module.

In some example embodiments, the apparatus comprises means for performing communication with a network device via a reconfigurable intelligent surface, RIS, using at least one of a first channel or a second channel, wherein the first channel is for a transmission to the RIS and the second channel is for a reception from the RIS.

In some example embodiments, the apparatus may comprise means for transmitting, to the RIS via the first channel, an indication of a detection of blockage of signals from the network device to the apparatus.

In some example embodiments, the apparatus may further comprise means for transmitting, to the RIS via the first channel, an indication to assist with communications between the apparatus and the network device.

In some example embodiments, the apparatus may further comprise means for receiving, from the RIS via the second channel, an indication indicating that the apparatus is to be connected with the RIS.

In some example embodiments, the indication may comprise at least one of a preamble, a msgA or an identifier of the apparatus.

In some example embodiments, the apparatus may further comprise means for receiving, from the RIS via the second channel, a message indicating that a phase reconfiguration of the RIS is completed.

In some example embodiments, the apparatus may further comprise means for transmitting, to the RIS via the first channel, a reference signal.

In some example embodiments, the first channel and the second channel may be a same channel.

In some embodiments, the apparatus further comprises means for performing other steps in some embodiments of the method 1000. In some embodiments, the means comprises at least one processor and at least one memory including computer program code, the at least one memory and computer program code configured to, with the at least one processor, cause the performance of the apparatus.

In some example embodiments, an apparatus capable of performing the method 1100 may comprise means for performing the respective steps of the method 1100. The means may be implemented in any suitable form. For example, the means may be implemented in a circuitry or software module.

In some example embodiments, the apparatus comprises means for engaging in communication between a terminal device and a network device, using at least one of a first channel or a second channel, wherein the first channel is for a reception from the terminal device and the second channel is for a transmission to the terminal device.

In some example embodiments, the apparatus may comprise means for receiving, from the terminal device via the first channel, an indication of a detection of blockage of signals from the network device to the terminal device.

In some example embodiments, the apparatus may comprise means for transmitting, to the terminal device via the second channel, an indication indicating that the terminal device is to be connected with the apparatus.

In some example embodiments, the apparatus may comprise means for receiving a reference signal via the first channel for channel sensing; and means for forwarding at least one measurement of the reference signal to the network device.

In some example embodiments, the apparatus may comprise means for receiving a request from the network device, wherein the request is related to the terminal device accessing the apparatus; means for transmitting a response signal, in response to the request; and means for switching to a sensing mode, based on transmitting the response signal.

In some example embodiments, the request may further comprise at least one of: a configuration of the terminal device; or location information of the terminal device.

In some example embodiments, the indication may comprise at least one of a preamble, a msgA or an identifier of the terminal device.

In some example embodiments, the apparatus may comprise means for transmitting a request to the network device, wherein the request is related to a terminal device accessing the apparatus; means for receiving a response signal from the network device; and means for switching to a sensing mode, based on receiving the response signal.

In some example embodiments, the request may further comprise an identifier of the terminal device.

In some example embodiments, the apparatus may comprise means for transmitting, to the terminal device via the second channel, a message indicating that a phase reconfiguration of the apparatus is completed.

In some example embodiments, a first set of active elements of the apparatus may be used for at least one of the first channel or the second channel; and/or a second set of active elements of the apparatus may be used for communications between the apparatus and the network device.

In some example embodiments, the first channel and the second channel may be a same channel.

In some embodiments, the apparatus further comprises means for performing other steps in some embodiments of the method 1100. In some embodiments, the means comprises at least one processor and at least one memory including computer program code, the at least one memory and computer program code configured to, with the at least one processor, cause the performance of the apparatus.

In some example embodiments, an apparatus capable of performing the method 1200 may comprise means for performing the respective steps of the method 1200. The means may be implemented in any suitable form. For example, the means may be implemented in a circuitry or software module.

In some example embodiments, the apparatus comprises means for performing communication with a terminal device via a reconfigurable intelligent surface, RIS.

In some example embodiments, the apparatus may comprise means for receiving, from the RIS, an indication that the terminal device detects blockage of signals from the apparatus; and means for determining that the terminal device is blocked from the apparatus based on a criterion check.

In some example embodiments, the apparatus may comprise means for transmitting, to the RIS, a request, wherein the request is related to the terminal device accessing the RIS; and means for receiving a response signal from the RIS.

In some example embodiments, the request may further comprise at least one of: a configuration of the terminal device; or location information of the terminal device.

In some example embodiments, the apparatus may comprise means for receiving, from the RIS, a request, wherein the request is related to the terminal device accessing the RIS; and means for receiving a response signal from the RIS.

In some example embodiments, the request may further comprise an identifier of the terminal device.

In some embodiments, the apparatus further comprises means for performing other steps in some embodiments of the method 1200. In some embodiments, the means comprises at least one processor and at least one memory including computer program code, the at least one memory and computer program code configured to, with the at least one processor, cause the performance of the apparatus.

Figure 13:
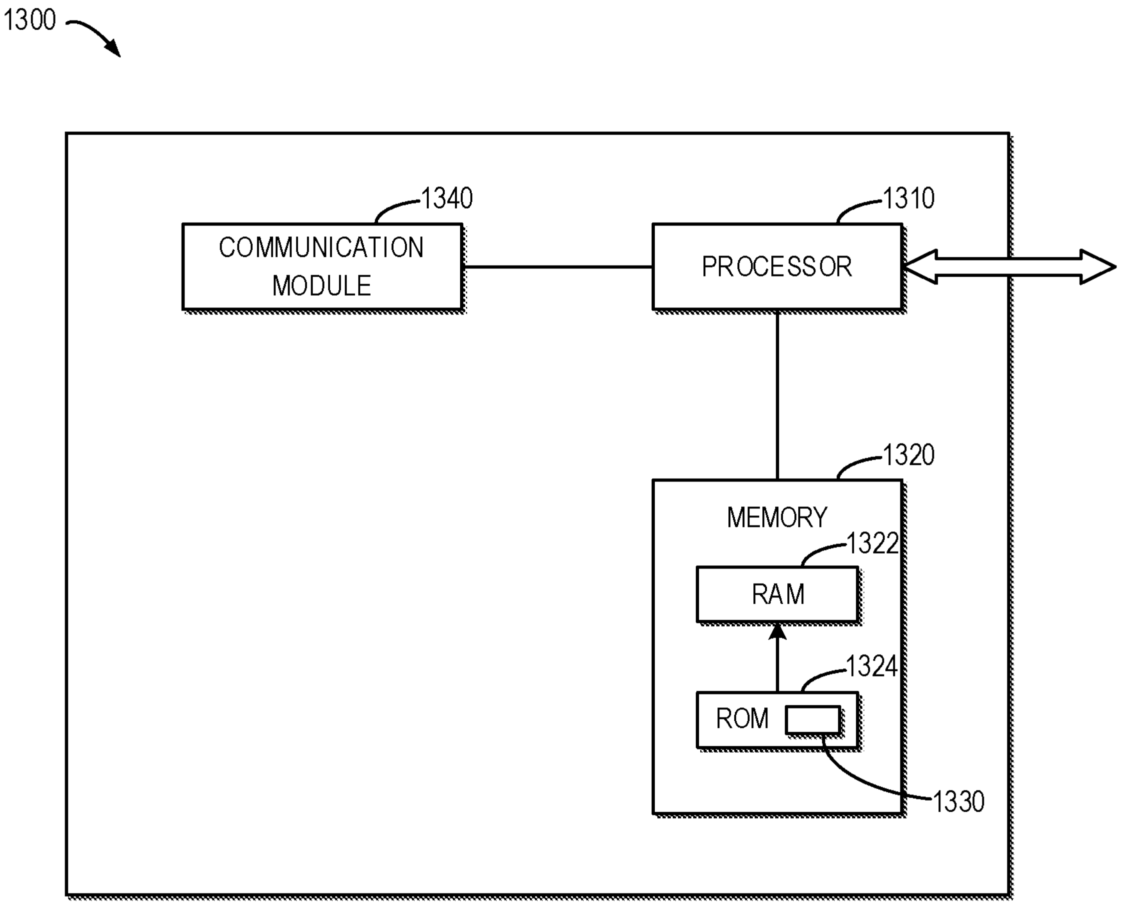
FIG. 13 illustrates an example simplified block diagram of an apparatus that is suitable for implementing embodiments of the present disclosure.

FIG. 13 is a simplified block diagram of a device 1300 that is suitable for implementing embodiments of the present disclosure. The device 1300 may be provided to implement the communication device, for example the terminal device 110, the RIS 120 or the network device 130 as shown in FIG. 1A. As shown, the device 1300 includes one or more processors 1310, one or more memories 1340 may couple to the processor 1310, and one or more communication modules 1340 may couple to the processor 1310.

The communication module 1340 is for bidirectional communications. The communication module 1340 has at least one antenna to facilitate communication. The communication interface may represent any interface that is necessary for communication with other network elements, for example the communication interface may be wireless or wireline to other network elements, or software based interface for communication.

The processor 1310 may be of any type suitable to the local technical network and may include one or more of the following: general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may include one or more non-volatile memories and one or more volatile memories. Examples of the non-volatile memories include, but are not limited to, a read only memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1322 and other volatile memories that will not last in the power-down duration.

A computer program 1330 includes computer executable instructions that are executed by the associated processor 1310. The program 1330 may be stored in the ROM 1324. The processor 1310 may perform any suitable actions and processing by loading the program 1330 into the RAM 1322.

The embodiments of the present disclosure may be implemented by means of the program so that the device 1300 may perform any process of the disclosure as discussed with reference to FIG. 2 and FIG. 8 to FIG. 12. The embodiments of the present disclosure may also be implemented by hardware or by a combination of software and hardware.

Figure 14:
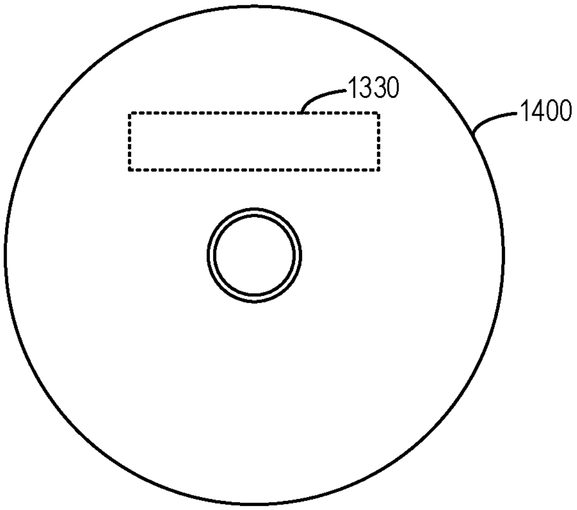
FIG. 14 illustrates an example block diagram of an example computer readable medium in accordance with some embodiments of the present disclosure.

In some example embodiments, the program 1330 may be tangibly contained in a computer readable medium which may be included in the device 1300 (such as in the memory 1320) or other storage devices that are accessible by the device 1300. The device 1300 may load the program 1330 from the computer readable medium to the RAM 1322 for execution. The computer readable medium may include any types of tangible non-volatile storage, such as ROM, EPROM, a flash memory, a hard disk, CD, DVD, and the like. FIG. 14 shows an example of the computer readable medium 1400 in form of CD or DVD. The computer readable medium has the program 1330 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 1000, 1100 or 1200 as described above with reference to FIG. 10, FIG. 11 or FIG. 12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:

at least one processor; and at least one memory storing instructions that, when executed by the at least one processor, cause the apparatus at least to:

perform communication with a network device exclusively via a reconfigurable intelligent surface (RIS) based on an absence of a direct communication link between the apparatus and the network device, using at least one of a first channel or a second channel wherein the apparatus is a low-power Internet of Things (IoT) device configured to operate with energy below 100 micro-watts and subject to intermittent connectivity, wherein the first channel is a UE assistance channel (UEAC) dedicated to communication between the apparatus and the RIS and is used for transmission to the RIS, and the second channel is used for reception from the RIS;

detect a blockage of signals from the network device based on a failure to receive a response within a predetermined blockage threshold time;

transmit, via the first channel to the RIS, a blockage indication comprising a preamble, a message A (msgA), and an identifier of the apparatus;

receive, from the RIS via the second channel, an acknowledgment indicating that the apparatus is connected to the RIS;

transmit, to the RIS via the first channel, a reference signal having a duration determined based on received signal strength from the RIS, and receive, from the RIS via the second channel, a phase reconfiguration completion message indicating that the RIS has adjusted phase shifts of its elements to establish a reflected communication path between the apparatus and the network device, wherein the RIS includes a plurality of passive reflecting elements and a subset of active elements allocated specifically for the UE assistance channel, and wherein the apparatus thereafter performs uplink data transmission to the network device through the RIS using the reflected communication path.

2. The apparatus of claim 1, wherein the reference signal transmitted to the reconfigurable intelligent surface is repeated or extended in duration in response to a determination that a received signal strength of a signal from the reconfigurable intelligent surface is below a threshold.

3. The apparatus of claim 2, wherein the blockage is detected based on expiration of a timer corresponding to a blockage threshold time during which no response is received from the network device following at least one access attempt or scheduling request.

4. The apparatus of claim 3, wherein the reconfigurable intelligent surface comprises a plurality of passive reflecting elements and a plurality of active elements, and wherein a subset of the active elements is exclusively allocated for the UE assistance channel while remaining elements are allocated for communication with the network device.

5. The apparatus of claim 4, wherein the reference signal transmitted to the reconfigurable intelligent surface is configured to enable the reconfigurable intelligent surface to determine at least one of an angle of arrival (AoA) or a time of arrival (ToA) for forwarding to the network device.

6. The apparatus of claim 5, wherein the apparatus is further caused to receive a phase reconfiguration indication signal from the reconfigurable intelligent surface that is transmitted over a range of angles centered around a last known location of the apparatus prior to transmission of the reference signal.

7. The apparatus of claim 6, wherein the reconfigurable intelligent surface is configured to operate in a sensing mode using active elements to measure the reference signal and to subsequently switch to a reflecting mode in which the active elements are configured as passive elements to redirect signals toward the network device.

8. A method comprising:

perform communication with a network device exclusively via a reconfigurable intelligent surface (RIS) based on an absence of a direct communication link between the apparatus and the network device, using at least one of a first channel or a second channel, wherein the apparatus is a low-power Internet of Things (IoT) device configured to operate with energy below 100 micro-watts and subject to intermittent connectivity, wherein the first channel is a UE assistance channel (UEAC) dedicated to communication between the apparatus and the RIS and is used for transmission to the RIS, and the second channel is used for reception from the RIS;

detect a blockage of signals from the network device based on a failure to receive a response within a predetermined blockage threshold time;

transmit, via the first channel to the RIS, a blockage indication comprising a preamble, a message A (msgA), and an identifier of the apparatus;

receive, from the RIS via the second channel, an acknowledgment indicating that the apparatus is connected to the RIS;

transmit, to the RIS via the first channel, a reference signal having a duration determined based on received signal strength from the RIS, and receive, from the RIS via the second channel, a phase reconfiguration completion message indicating that the RIS has adjusted phase shifts of its elements to establish a reflected communication path between the apparatus and the network device, wherein the RIS includes a plurality of passive reflecting elements and a subset of active elements allocated specifically for the UE assistance channel, and wherein the apparatus thereafter performs uplink data transmission to the network device through the RIS using the reflected communication path.

* * * * *